W. A. ZEIDLER.
MACHINE FOR FOLDING, EDGE IRONING, AND SHAPING TURN-DOWN COLLARS.
APPLICATION FILED SEPT. 18, 1909.
1,010,712.
Patented Dec. 5, 1911.
5 SHEETS—SHEET 1.
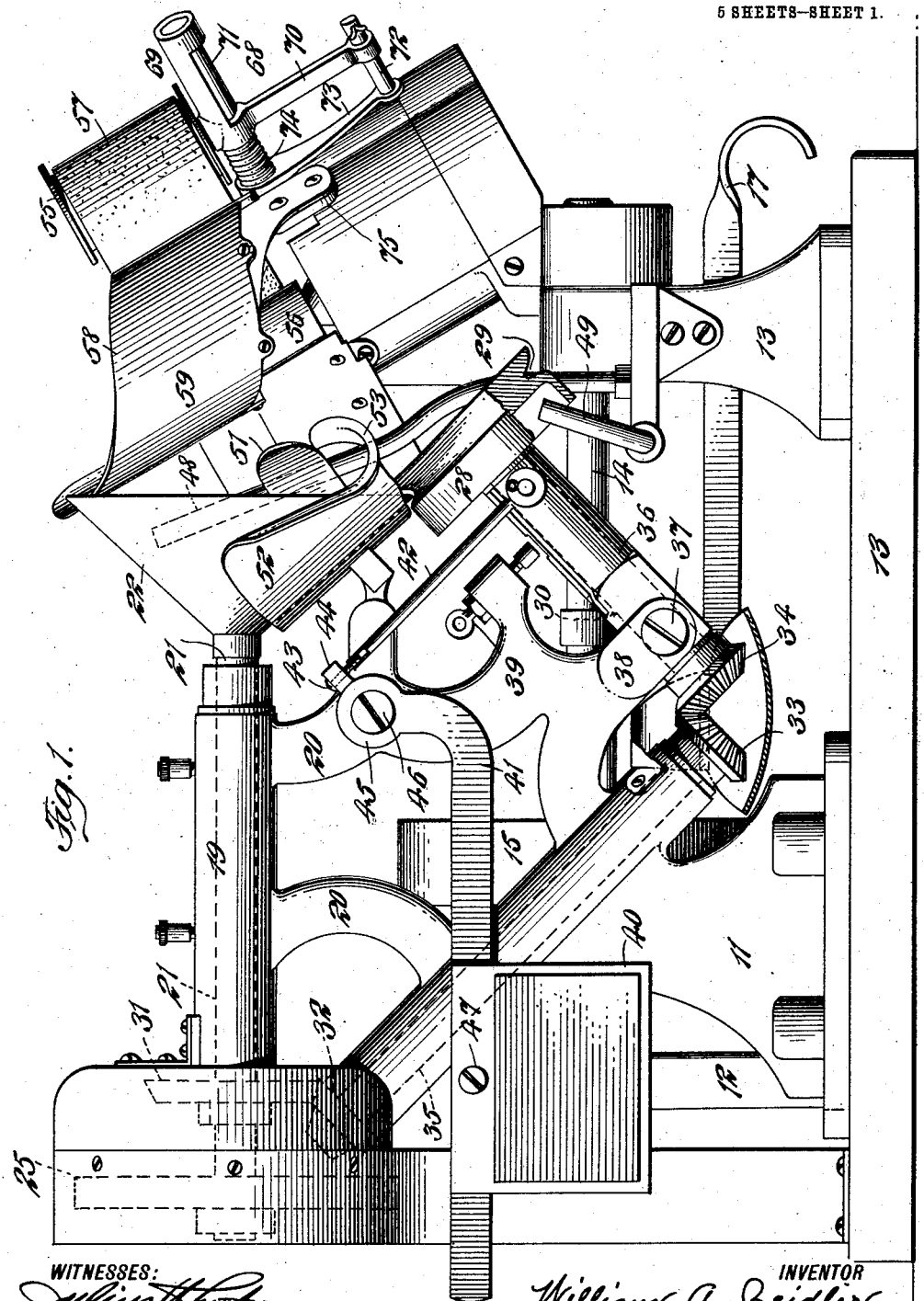
WITNESSES:
INVENTOR
William A. Zeidler,
BY
Chas. E. Gill
ATTORNEY W. A. ZEIDLER.
MACHINE FOR FOLDING, EDGE IRONING, AND SHAPING TURN-DOWN COLLARS.
APPLICATION FILED SEPT. 18, 1909.
1,010,712.
Patented Dec. 5, 1911.
5 SHEETS—SHEET 2.
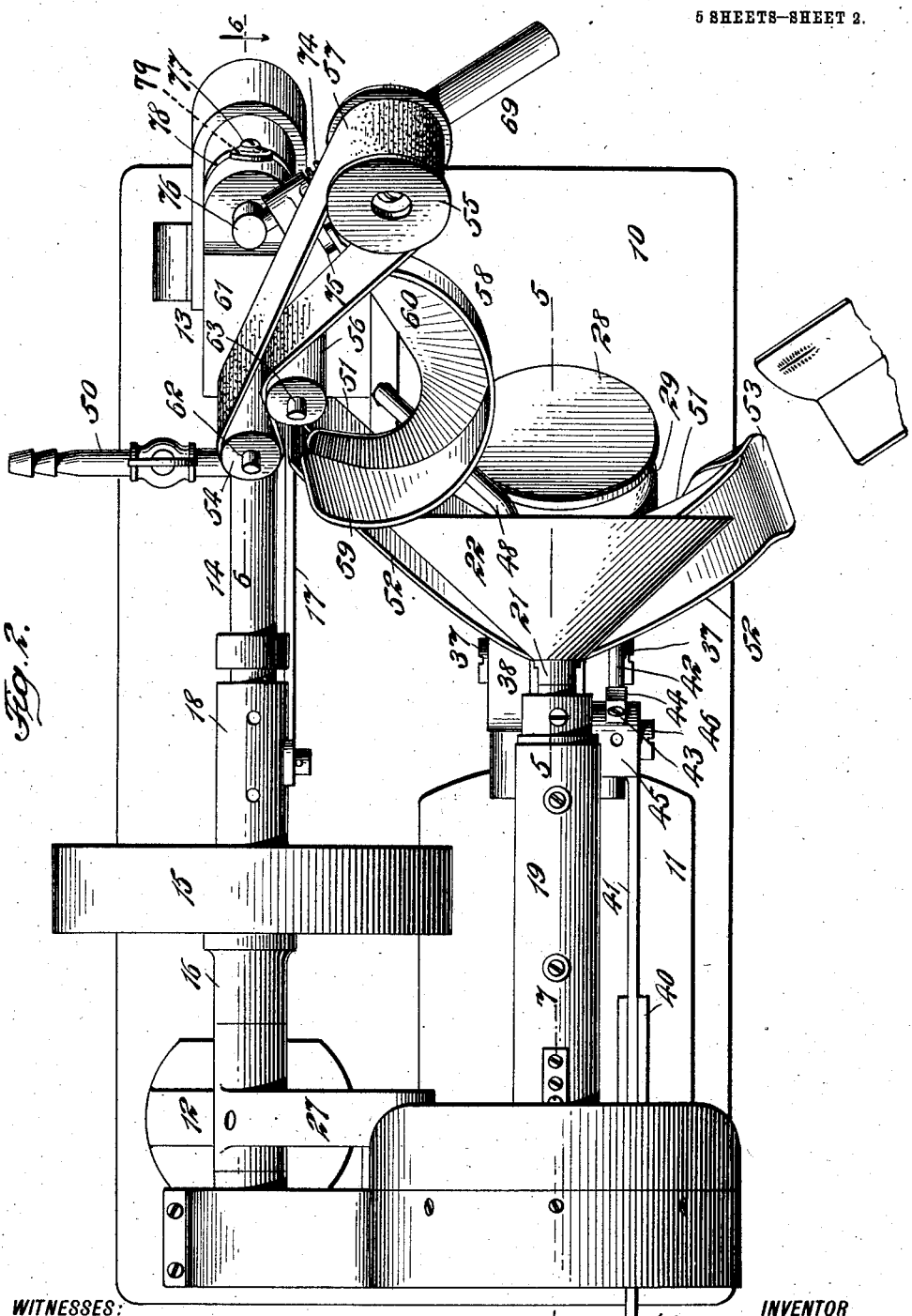
WITNESSES:
INVENTOR
William A. Zeidler,
BY
Chas. E. Gill
ATTORNEY W. A. ZEIDLER.
MACHINE FOR FOLDING, EDGE IRONING, AND SHAPING TURN-DOWN COLLARS.
APPLICATION FILED SEPT. 18, 1909.
1,010,712.
Patented Dec. 5, 1911.
5 SHEETS—SHEET 3.
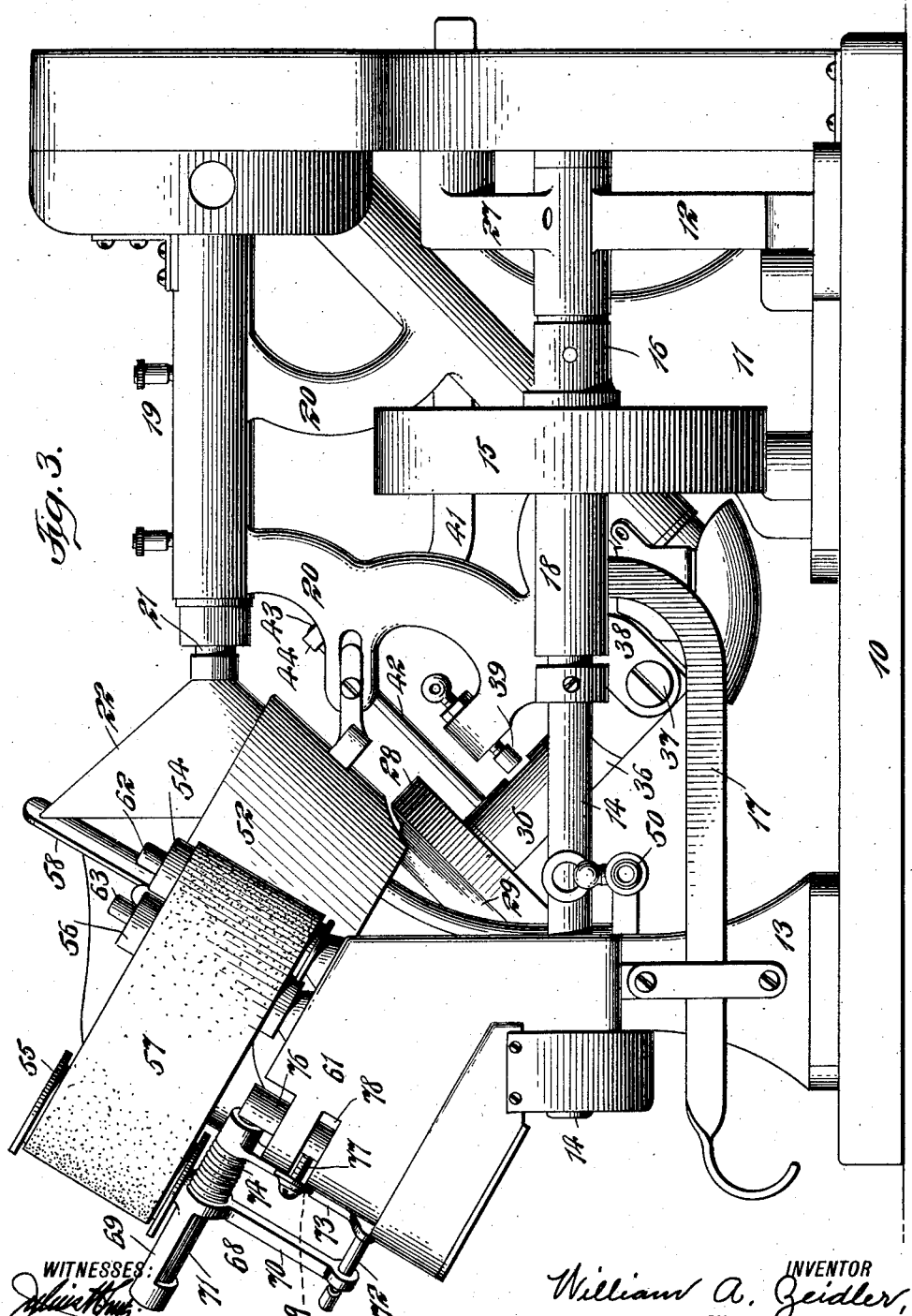

W. A. ZEIDLER.
MACHINE FOR FOLDING, EDGE IRONING, AND SHAPING TURN-DOWN COLLARS.
APPLICATION FILED SEPT. 18, 1909.
1,010,712.
Patented Dec. 5, 1911.
5 SHEETS—SHEET 4.
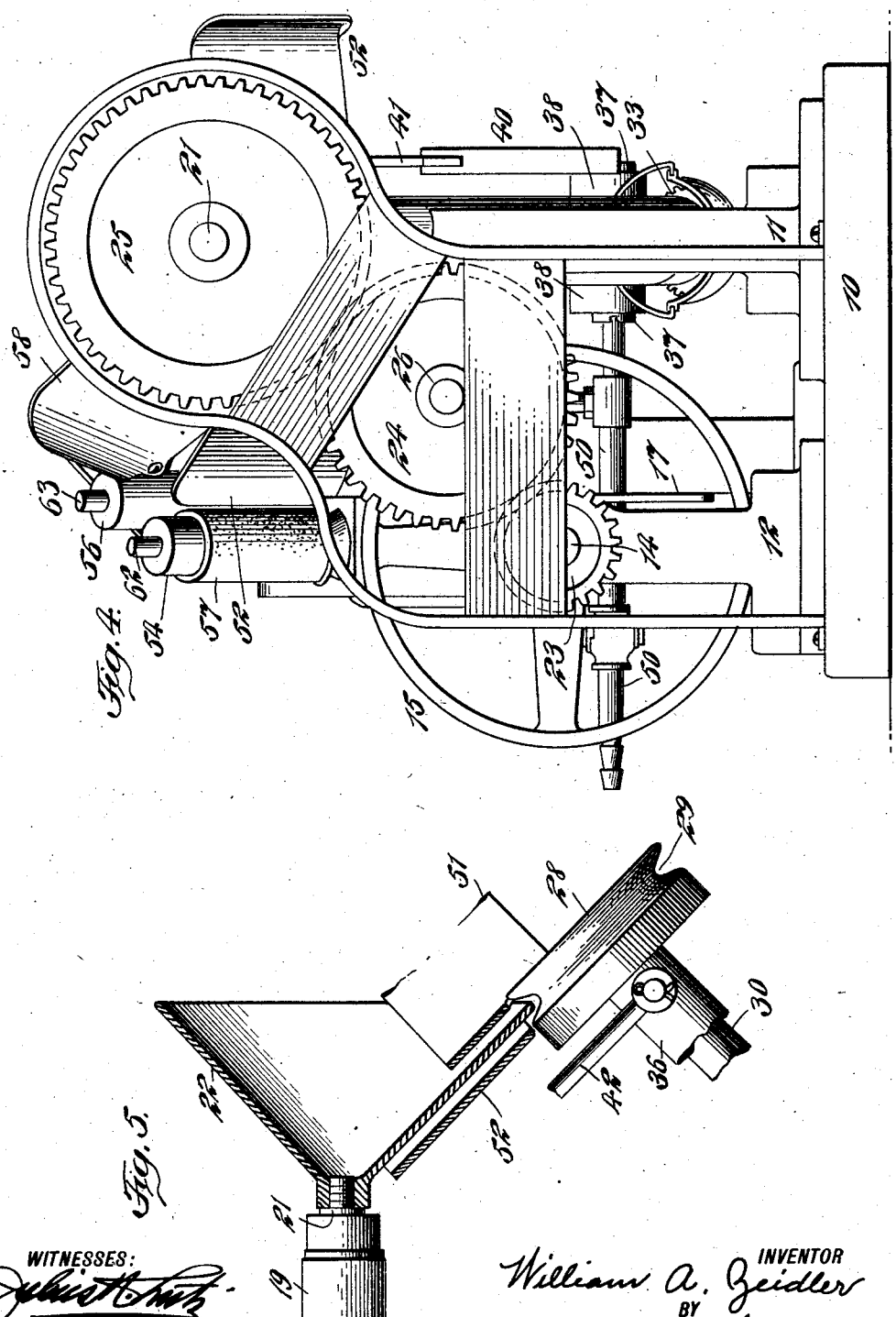
WITNESSES:
INVENTOR
William A. Zeidler
BY
Chas. C. Gill
ATTORNEY W. A. ZEIDLER.
MACHINE FOR FOLDING, EDGE IRONING, AND SHAPING TURN-DOWN COLLARS.
APPLICATION FILED SEPT. 18, 1909.
1,010,712.
Patented Dec. 5, 1911.
5 SHEETS—SHEET 5.
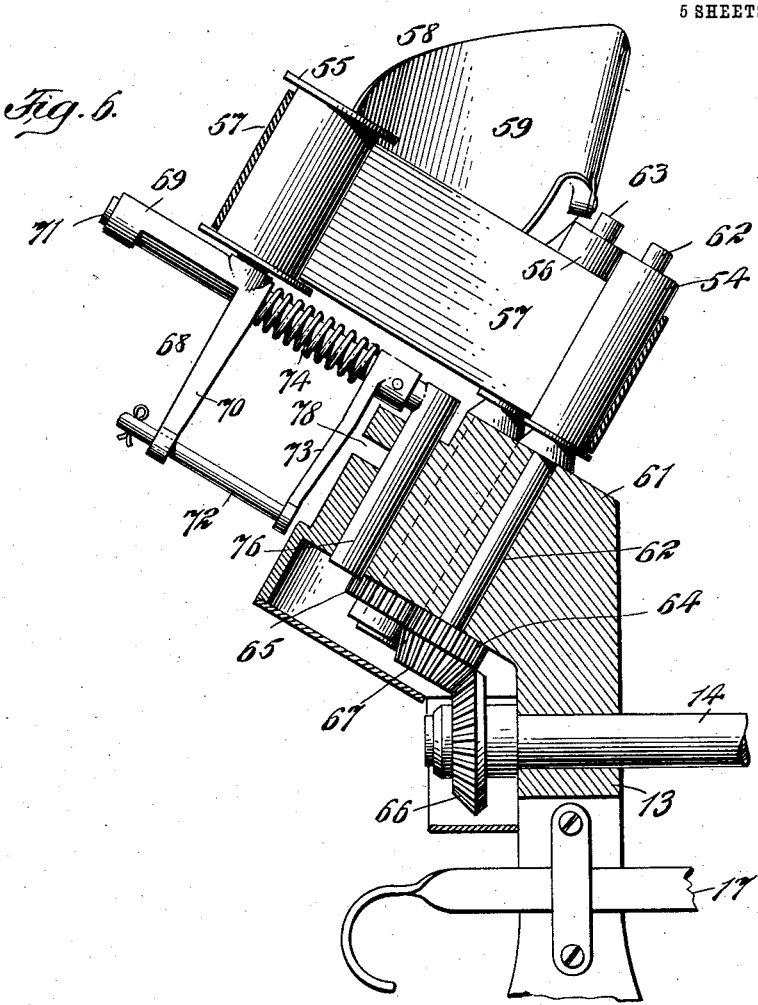
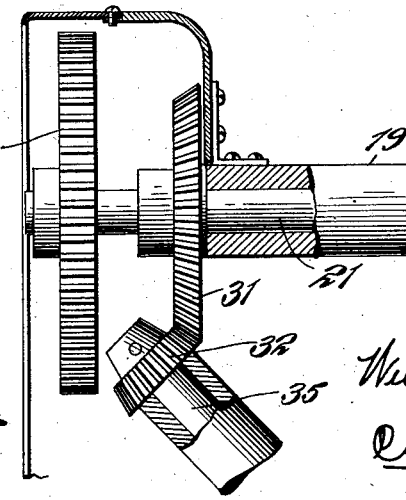

UNITED STATES PATENT OFFICE.

WILLIAM A. ZEIDLER, OF NEW YORK, N. Y., ASSIGNOR TO WILLIAM A. ZEIDLER COMPANY, OF NEW YORK, N. Y., A CORPORATION OF NEW YORK.

MACHINE FOR FOLDING, EDGE-IRONING, AND SHAPING TURN-DOWN COLLARS.

1,010,712.   Specification of Letters Patent.   Patented Dec. 5, 1911.

Application filed September 18, 1909. Serial No. 518,327.

*To all whom it may concern:*

Be it known that I, WILLIAM A. ZEIDLER, a citizen of the United States, and a resident of New York city, in the county of New York and State of New York, have invented certain new and useful Improvements in Machines for Folding, Edge-Ironing, and Shaping Turn-Down Collars, of which the following is a specification.

The invention relates to improvements in machines for folding, edge-ironing and shaping turn-down collars and similar articles; and it consists in the novel features and combinations of parts hereinafter described and particularly pointed out in the claims.

The object of the invention is to provide a machine which will uniformly, properly and rapidly fold, iron the folded edge of and shape the collars in a manner which will render the latter entirely satisfactory to the wearer and not injure the collar.

The present invention comprises certain improvements, hereinafter described, upon the machines made the subject of Letters Patent No. 642,660 granted February 6, 1900 to William A. Zeidler and No. 646,784 granted April 3, 1900 to William A. Zeidler; and said invention will be fully understood from the detailed description hereinafter presented, reference being had to the accompanying drawings, in which:

Figure 1 is a front side elevation, partly in section, of a machine constructed in accordance with and embodying the invention; Fig. 2 is a top view of the same; Fig. 3 is a rear side elevation of the same; Fig. 4 is an end view of the same taken from the left hand end of Fig. 2; Fig. 5 is a detached sectional view, partly broken away, through a portion of the machine on the dotted line 5—5 of Fig. 2; Fig. 6 is a transverse sectional view through a portion of the machine on the dotted line 6—6 of Fig. 2 and taken in the direction of the arrow; and Fig. 7 is a vertical longitudinal section through a portion of the machine on the dotted line 7—7 of Fig. 2.

In the drawings, 10 designates the bed of the machine, and 11, 12 and 13 denote, respectively, three standards upon said bed plate and which support all of the operative mechanism of the machine.

The main driving shaft 14 is mounted in the standards 12, 13 and provided with a belt-wheel or pulley 15 whose hub constitutes one member of a clutch to engage with a fixed clutch member 16 fastened to the shaft 14. When the parts 15, 16 are in engagement with each other power will be communicated from the belt wheel 15 to the shaft 14 in the customary manner, and when the wheel 15 is free of the fixed clutch member 16, said wheel will be free on the shaft 14 and not impart motion thereto. A suitable shipper 17 is provided for moving a sleeve 18 against the wheel 15 for the purpose of driving it into engagement with the clutch member 16. The details of the power wheel and clutch will, of course, vary as circumstances or the desire of the manufacturer may suggest.

Within a sleeve 19 supported by arms 20 from the standard 11 is mounted an auxiliary driving shaft 21, upon the front end of which is secured a conical shaping disk 22 of the character described in my aforesaid Letters Patent. The shaft 21 is driven from the shaft 14 through a series of gear wheels 23, 24, 25 (Fig. 4), the gear wheel 23 being rigid on the shaft 14, the gear wheel 25 rigid on the shaft 21, and the gear wheel 24 being simply an intermediate gear wheel supported on a stud 26 extending from an arm 27 forming a part of the standard 12. The conical shaping disk 22 has imparted to it during the operation of the machine a rotary motion, but is otherwise rigidly held, and said disk 22 has its conical interior extended outwardly from the end of the shaft 21, as shown in Fig. 5, whereby the interior chamber of said disk is not occupied by any portion of the shaft and is so exposed that the collars may readily pass through the same and be observed by the operator.

The conical disk 22 coöperates with a rotary ironing and shaping roller 28, having an annular groove 29 into which the edge of the disk 22 passes. The ironing roller 28 is secured upon the upper end of a shaft 30, which extends upwardly and outwardly and is adapted to be driven from the shaft 21 through the gear wheels 31, 32 (Fig. 7), 33, 34 (Fig. 1), and an inclined shaft 35, the gear wheels 32, 33 being on the shaft 35, the gear wheel 31 on the shaft 21 and the gear wheel 34 on the shaft 30. The disk 22 and ironing roller 28 rotate toward each other, and the folded collar is fed in between the adjoining portions of said disk and roller, the inner fold or section of the collar being disposed within the disk 22, the outer fold or section of the collar against the exterior of said disk and the folded edge of the collar being against the edge of said disk and within the groove 29 of the roller 28. The ironing roller 28 should have a yielding relation to the edge of the coöperating disk 22 because of the varying thicknesses of collars and in order to enable said roller to properly engage the folded edge of the collar without injuring the same, and to provide for this condition I mount the shaft 30 within a sleeve 36 which is pivotally supported upon the inner ends of screws 37 which enter arms 38 extending forwardly and downwardly from and are integral with the standard frame 11. The shaft 30 may, therefore, have a limited tilting or oscillatory motion imparted to it and thereby the ironing roller 28 may have its relation to the disk 22 regulated at will. If left unrestrained the roller 28 would have a tendency to fall away from the disk 22 so far as the gear wheels 34, 33 would permit, and to prevent any undue approach of the roller 28 toward the disk 22 I provide an adjustable stop 39 which is supported from the main standard or frame 11 and in line with the sleeve 36. It is desirable that the roller 28 should remain in near relation to the disk 22, but it is not desirable, in many instances, that the said roller should press with great force directly against said disk, for under such condition the collar passing through the machine might be injured at its folded edge. The roller 28 is given a yielding pressure toward the disk 22 by means of a weight 40, crank arm or beam 41 and rod 42, the latter at its lower end being pivotally secured to the sleeve 36 and at its upper end being internally threaded to receive a screw 43 which passes loosely through a stud 44 extending upwardly and forwardly from the hub of the crank arm 41. When the screw 43 is turned in one direction it will draw upwardly on the rod 42 and thereby shorten the distance between the disk 22 and roller 28, and when said screw is turned in the reverse direction it will lengthen said space between the disk and roller by allowing said roller to fall farther away from the disk. The forward end of the crank arm 41 extends upwardly, as shown in Fig. 1, and terminates in the hub 45, through which a pivot screw 46 passes, this screw constituting the pivotal point for said arm. The weight of the roller 28 and the freedom of play between the gear wheels 34, 33 enable said roller, through the rod 42, to normally hang from the stud 44 of the crank arm 41, and the roller 28 is restrained from falling unduly away from the disk 22 by the fact that the head of the screw 43 has a bearing against the upper side of said stud 44.

When a collar is inserted between the disk 22 and ironing roller 28 it is fed inwardly by the rotary action of said disk and roller, and due to the thickness of the collar the roller 28 is forced downwardly in a direction from the disk 22, and this downward movement of the roller is resisted by the weight 40. The weight 40, crank arm 41 and stud 44 hold the roller 28 in a proper initial relation to the disk 22, but when a collar is inserted between said disk and roller, the thickness of the collar presses the roller slightly downwardly, and said roller when thus pressed downwardly operates through the rod 42, stud 44 and arm 41 to slightly elevate the weight 40, whereby the latter is enabled to cause the roller 28 to yieldingly press against the collar. The adjustable stop 39 prevents the weight 40 from unduly elevating the roller 28 toward the disk 22, and the force the weight 40 exerts against the roller 28 may be varied by the adjusting of the said weight along the arm or beam 41, the weight 40 exerting the greatest force when it is at the outer or left hand end of said arm or beam. The screw or adjustable rod section 43 pulls downwardly against the stud 44 when the roller 28 is pressed downwardly, and said screw 43, as is obvious, may be utilized to regulate the length of the rod 42. The stud 44 represents a short lever and the arm or beam 41 a long lever which is substantially horizontally disposed at the front side of the machine, and the weight 40 is adjustably secured on said end of said arm or beam by means of a screw 47. With a reasonably light weight hung from the arm or beam 41, the ironing roller 28 may be caused to press with considerable force against the collar passing through the machine, this being due to the leverage of said arm 41.

When the machine is in use the conical disk 22 will be heated by a flame from a gas-burner 48 and the ironing roller 28 will be heated by a flame from a gas-burner 49, which burners are connected with a gas supply pipe 50 of usual character.

The collars while passing between the ironing-roller 28 and disk 22 are guided and kept in proper relation to the inner and outer walls of the disk by a curved plate 51 extending within the chamber of the disk and a plate 52 curving around the exterior of said disk and curled over at its front end, as at 53, to create a suitable feed trough for directing the collars inwardly to said disk and roller. The plate 51 compels the inner fold or section of the collar to travel close against the inner surface of the disk 22, and the plate 52 compels the outer fold or section of the collar to travel close against the outer surface of said disk.

The collars are ironed at their folded edge while passing between the disk 22 and roller 28 and also folded and shaped, but in many cases a further shaping or a reduced curvature of the collar is desirable and to meet this want I provide shaping means mounted mainly on the standard 13 and utilize the plates 51, 52 at the rear or delivery side of the roller 28 and disk 22 for feeding the collars to said shaping-means, which grips the rearwardly advancing portions of the collars and draws the collars between said disk and roller and forces them upwardly along a spirally-formed receiver from which they are removed in finished condition. The said shaping means preferably comprises rollers 54, 55, 56 and a belt 57, and the spirally formed receiver, designated by the numeral 58, comprises a side wall 59 and bottom 60, and all these parts are supported from a head 61 (Fig. 6) formed on the upper end of the standard 13. The belt 57 is on the rollers 54, 55 and presses at its side firmly against the side of the roller 56, as shown in Fig. 2, and in the use of the machine the collars as they travel from the ironing-roller 28 and disk 22 enter between the roller 56 and belt 57 and are carried along between said roller and belt and forced upwardly into and along the spiral receiver 58. The rollers 54, 56 are on shafts 62, 63, respectively, (Fig. 6) geared together at their lower ends by gear-wheels 64, 65 and driven from the shaft 14 through bevel gear wheels 66, 67 connecting the shafts 62, 14. The roller 55 is free on its shaft which is a part of a frame 68 comprising a tubular member 69 and a depending arm 70 and slidably mounted on a rod 71 supported from the head 61. The lower end of the arm 70 contains an eye to pass on a guide rod 72 held by a bracket 73 secured on the rod 71. On the rod 71 between the bracket 73 and frame 68 is a coiled spring 74 which presses outwardly against the frame 68 and thereby causes the roller 55 to hold the belt 57 under a spring tension, said belt being thereby caused to press firmly, though yieldingly, against the roller 56 and any collar that may be fed between said belt and roller. The receptacle 58 curls upwardly and toward the left, looking at the front of the machine, and at its lower right hand end receives the gradually advancing collars as they travel from behind the roller 56, said collars traveling upwardly along the spirally curved path created by the floor 60 and side wall 59 of said receptacle. The receptacle 58 holds the collars in a closely curved form and not only aids in shaping the collars but confines them for a sufficient period for the collars to receive a proper "set."

The operation of the machine will be largely understood from the description hereinbefore presented and hence only brief further explanation is required.

The disk 22 and its shaft 21 are driven from the main shaft 14 through the gear wheels 23, 24, 25, and the ironing-roller 28 is driven from the shaft 21 through the gear wheels 31, 32, 33, 34 and shafts 35, 30. The roller 54 is driven from the shaft 14 and imparts its movement to the roller 56 and belt 57, which traveling around the roller 55 causes the latter to rotate.

The collars, folded to some extent by hand, are manually fed to the disk 22 and roller 28, the feed trough 53 aiding in this step. The fold of the collar passes between the edge of the disk 22 and the surface of the groove 29 in the roller 28, while the inner fold or section of the collar is delivered between the inner surface of the disk 22 and the adjacent surface of the plate 51, and the outer fold or section of the collar passes between the outer surface of said disk and the inner adjacent surface of the plate 52. The disk 22 and roller 28 will grip the collar and draw the same into the machine and compel the collar to travel along beyond the disk and roller and between the plates 51, 52 to the point at which it enters between the roller 56 and belt 57 (Fig. 2), which roller and belt then grip the collar and draw it along from the disk 22 and roller 28 and cause it to curve on a short radius while traveling around the rear side of said roller 56. The roller 56 and belt 57 feed the folded, edge-ironed and shaped collar to the upwardly curled receptacle 58 and push the collar along the same, whereby the collar receives a further shaping treatment and finally becomes set and is then removed ready for immediate use if desired. The receptacle 58 curls upwardly and inwardly or toward the vertical plane of the disk 22, as shown in Fig. 2, and hence the collar through its entire travel is acted upon to curve or shape it ready for use.

A convenient, though not necessarily an essential, feature of the machine resides in securing the receptacle 58 to a bracket 75 on the rod 71 and in securing the inner end of said rod to a pivot post 76 mounted in the head 61 at a point rearwardly of the normal longitudinal line of the belt 57, as shown in Fig. 2, since thereby if a collar should be caught or become arrested from any cause during its line of travel, it may be released by the operator taking hold of the tubular rod 69 as a handle and swinging the rod 71, receiver 58 and roller 55 around toward the right, looking at Fig. 2, to the rear of the vertical plane of the post 76, said rod 71 carrying the receiver 58 with it and the movement of the roller 55 relieving the belt 57 from the roller 56 and releasing the collar behind said roller 56. When the roller 55 is in its operative position shown in Fig. 2, the tension of the spring 74 acts to keep it in that position, and when the roller is being swung around to the rear of the pivot post 76 said spring becomes compressed until the roller 55 passes the line of said post, after which the spring expands and holds the roller 55 in its rear inoperative position. After a "caught" collar has been released, the operator may quickly restore the machine to its operative position by grasping the tubular rod 69 and pulling it frontward to the position shown in Fig. 2. As means for sustaining the pivot-post 76 I provide a screw 77 (Fig. 3) which enters said post and lies within a slot 78 in the head 61. The slot 78 permits the screw 77 to move along a circular path when the pivot post 76 is turned by the operator in swinging the roller 55 rearwardly or frontwardly. The head 61 along the slot 78 is on the arc of a circle, and on the screw 77 is a washer 79 which spans the cross-section of said slot and engages the head and may be tightened against said head by screwing the screw 77 inwardly until the head of the screw binds said washer against the head 61. A very desirable feature due to the pivotal mounting of the frame carrying the roller 55 and receptacle 58, is that by means of the screw 77 and washer 79 the said frame roller and receptacle may be adjusted in various positions along the arc of a circle, with the result that the extent of the lapping or folding of the belt 57 around the side of the roller 53 may be regulated at will in accordance with the degree of curvature it is desired said belt and roller 56 shall impart to the collars passing through the machine. The collars will be curved on a short arc when the belt 57 laps to a considerable extent around the side of the roller 56, and as the roller 55 is adjusted rearwardly the lap of the belt against the roller 56 will be lessened and less curvature will in consequence be imparted to the collars traveling behind said roller. Some collars will take a sharper curvature than others, and to fit the machine for collars of all makes and conditions I make the shaper mechanism adjustable, as just hereinbefore described.

What I claim as my invention and desire to secure by Letters Patent, is:

1. In a machine of the character described, a horizontal driving shaft having thereon a hollow conical disk, power mechanism connected with said shaft for driving the same and through it said disk, a grooved roller below said disk and coöperating therewith and receiving at its groove the edge of said disk at the lower side of the latter, guides for directing the collar through and beyond said disk and roller, shaper mechanism for receiving the collar from said guides, reducing its then curvature and compelling its onward travel, and an upwardly extending spiral receptacle for receiving the collar from said shaper mechanism; substantially as set forth.

2. In a machine of the character described, a horizontal driving shaft having upon its forward end a hollow conical disk whose walls flare forwardly and outwardly from the end of said shaft, power mechanism connected with said shaft for driving the same and through it said disk, a grooved roller below said disk and coöperating therewith and receiving in its groove the edge of said disk at the lower side of the latter, guides for directing the collar through and beyond said disk and roller, and power driven shaper mechanism for receiving the collar from said guides and reducing its then curvature and compelling its onward travel through the machine; substantially as set forth.

3. In a machine of the character described, a driving shaft having on its forward end a hollow conical disk whose walls flare forwardly and outwardly, power mechanism for driving said shaft and through it said disk, a rotary grooved roller below said disk and coöperating therewith and receiving at its groove the edge of said disk, guides for directing the collar through and beyond said disk and roller, and a shaper at the discharge side of said disk and roller and along which the folded collar is forced for reducing the same to the desired curvature; substantially as set forth.

4. In a machine of the character described, a hollow conical disk, means for driving the same, a rotary grooved roller coöperating with said disk and receiving at its groove the edge thereof, means for directing the collar through said disk and roller with its folded edge in the groove of the roller and controlling the collar during its entire travel, and shaper-mechanism for receiving the collar as it leaves said disk and roller and comprising a power driven endless belt, rollers on which the belt is mounted, and an intermediate roller against the side of which said belt at its side firmly presses, substantially as set forth.

5. In a machine of the character described, a driving shaft having on its forward end a conical disk whose sides flare forwardly, means for driving the same, a rotary grooved roller coöperating with said disk and receiving at its groove the edge thereof, means for directing the collar through said disk and roller with its folded edge in the groove of the roller, and shaper-mechanism for receiving the collar as it leaves said disk and roller and comprising a power driven endless belt, rollers on which the belt is mounted, means slidably mounting one of said rollers, a spring acting to press said slidably-mounted roller outwardly to keep said belt under tension, and an intermediate roller against the side of which said belt at its side firmly presses, substantially as set forth.

6. In a machine of the character described, mechanism comprising a conical disk and coöperating grooved roller for ironing the fold-edge of a collar, and means for driving said mechanism, combined with collar-shaper mechanism at the delivery side of said ironing mechanism and comprising a power driven endless belt, rollers on which the belt is mounted, means slidably mounting one of said rollers, a spring acting to press said slidably-mounted roller outwardly to keep said belt under tension, an intermediate roller against the side of which said belt at its side laps and presses to engage the collar and cause it to travel between said belt and roller and become shaped, and means for adjusting the extent of lap said belt shall have around said intermediate roller; substantially as set forth.

7. In a machine of the character described, mechanism for ironing the fold-edge of a collar, and means for driving said mechanism, combined with collar-shaper mechanism at the delivery side of said ironing mechanism and comprising a power driven endless belt, rollers on which the belt is mounted, a frame slidably mounting one of said rollers, a spring acting to press said slidably mounted roller outwardly to keep said belt under tension, an intermediate roller against the side of which said belt at its side firmly presses to engage the folded collar and cause it to travel between said belt and roller, and means pivotally mounting the frame of said slidable roller so that it may be swung in a direction to carry said belt from said intermediate roller and to an inoperative position; substantially as set forth.

8. In a machine of the character described, mechanism for ironing the fold-edge of a collar, and means for driving said mechanism, combined with collar-shaper mechanism at the delivery side of said ironing mechanism and comprising a power driven endless belt, rollers on which the belt is mounted, a frame slidably mounting one of said rollers, a spring acting to press said slidably mounted roller outwardly to keep said belt under tension, an intermediate roller against the side of which said belt at its side firmly presses to engage the folded collar and cause it to travel between said belt and roller, a receiver connected with said frame to receive the collar from said belt and roller, and means pivotally mounting said frame so that said slidably-mounted roller, belt and receiver may be swung in a direction from said intermediate roller and to an inoperative position; substantially as set forth.

9. In a machine of the character described, mechanism for ironing the fold-edge of a collar, and means for driving said mechanism, combined with collar-shaper mechanism at the delivery side of said ironing mechanism and comprising a power driven endless belt 57, rollers 54, 55 on which said belt is mounted, an intermediate roller 56 against the side of which said belt at its side firmly presses to engage the folded collar and cause it to travel between said belt and roller for shaping it, a slide 69 carrying the belt-roller 55, a rod 71 on which said slide is mounted and which is pivotally mounted at its inner end so that it may be swung laterally, and a spring 74 on said rod acting to press said slide and roller 55 outwardly on said rod, said belt extending when in its operative position on a line at one side of the pivot-point of said rod and when in its inoperative position on a line at the other side of said pivot-point; substantially as set forth.

10. In a machine of the character described, mechanism for ironing the fold-edge of a collar, and means for driving said mechanism, combined with collar-shaper mechanism comprising a power driven endless belt, rollers on which the belt is mounted, a frame slidably mounting one of said rollers, a spring acting to press said slidably mounted roller outwardly to keep said belt under tension, an intermediate roller against the side of which said belt at its side firmly presses to engage the folded collar and cause it to travel between said belt and roller and become shaped, means pivotally mounting the frame of said slidable roller so that the same may be moved on the arc of a circle to vary the lap of the belt around said intermediate roller, and means for securing said frame in its adjusted positions; substantially as set forth.

Signed at New York city, in the county of New York and State of New York, this 17th day of September A. D. 1909.

WILLIAM A. ZEIDLER.

Witnesses:
CHAS. C. GILL,
ARTHUR MARION.

Copies of this patent may be obtained for five cents each, by addressing the "Commissioner of Patents, Washington, D. C."